(12) United States Patent
Gurol et al.

(10) Patent No.: US 7,850,854 B2
(45) Date of Patent: Dec. 14, 2010

(54) METHOD FOR PERCHLORATE REMOVAL AND DESTRUCTION

(75) Inventors: Mirat D. Gurol, San Diego, CA (US); Vladimir Zlotopolski, Escondido, CA (US)

(73) Assignee: PURE O TECH, Inc., Escondido, CA (US)

( * ) Notice: Subject to any disclaimer, the term of this patent is extended or adjusted under 35 U.S.C. 154(b) by 569 days.

(21) Appl. No.: 11/935,886

(22) Filed: Nov. 6, 2007

(65) Prior Publication Data

US 2008/0105628 A1   May 8, 2008

Related U.S. Application Data

(60) Provisional application No. 60/864,585, filed on Nov. 6, 2006.

(51) Int. Cl.
*B01D 15/04*   (2006.01)

(52) U.S. Cl. .......... 210/662; 210/663; 210/667; 210/668; 210/670; 210/673; 95/8; 95/132

(58) Field of Classification Search ............. 210/662, 210/663, 667, 668, 670, 673, 675–676; 95/8, 95/132
See application file for complete search history.

(56) References Cited

U.S. PATENT DOCUMENTS 6,531,065 B2 * 3/2003 Gurol et al. ............... 210/669
2009/0018668 A1 * 1/2009 Galbraith ............... 623/23.65

* cited by examiner

*Primary Examiner*—Chester T Barry
(74) *Attorney, Agent, or Firm*—Mitchell P. Brook; Luce, Forward, Hamilton & Scripps LLP

(57) ABSTRACT

A method and apparatus for adsorbing perchlorate in a fluid and successively destroying it. Perchlorate in the fluid is removed by adsorption on an adsorbent in a column. The adsorbent is then regenerated by desorbing perchlorate, and the perchlorate in the regenerant is then chemically destroyed.

10 Claims, 5 Drawing Sheets

Effect of borohydride concentration on GAC regeneration
(without additional NaOH)

Effect of NaOH on GAC regeneration
(NaOH in N, NaBH4 in g/L)

METHOD FOR PERCHLORATE REMOVAL AND DESTRUCTION

FIELD OF THE INVENTION

The present invention relates to apparatus and methods for purifying water. More particularly, the present invention relates to apparatus and methods for adsorbing perchlorate in water and then destroying it.

BACKGROUND OF THE INVENTION

Since the mid-1940s, perchlorate, and in particular ammonium perchlorate, has been used in the production of solid rocket fuel for military and space applications. Additionally various perchlorate salts have been used in a wide variety of non-military applications. For example, perchlorate salts are used in the production of matches, safety flares, fireworks and other pyrotechnics.

That past use of perchlorate has given rise to a significant present problem of perchlorate contamination of soil and ground water. The perchlorate contamination is a significant problem because it is potentially toxic. In particular, ingested perchlorate interferes with the thyroid gland's ability to utilize iodine, an essential nutrient. As a result, production of thyroid hormones that regulate metabolism and growth may be disrupted. Although short-term fluctuations in thyroid hormone levels are normal and the body has a certain capacity to cope and adjust for these small changes, continuous thyroid disruption may cause an imbalance, especially when a body is already under stress.

Since the perchlorate contamination threat was identified, various efforts have been initiated with the purpose of establishing goals and regulatory standards. In 2004, the California Office of Environmental Health Hazard Assessment published a public health goal of 6 ppb. In addition, the U.S. Environmental Protection Agency has proposed a limit for perchlorate of 24.5 ppb and the Massachusetts Department of Environmental Protection has proposed a limit of 2 ppb.

In view of the existing and impending restrictions on perchlorate in potable water, various attempts have been made to provide apparatus and methods for removing perchlorate from water. Various attempts have been made to remove perchlorate from water using microorganisms. For example, the bacterium, Perc 1 ace, has been used in a flow-through system to reduce perchlorate in water. In that system, contaminated ground water flowed through a bacterially active zone of a bioreactor and was exposed to Perc 1 ace. Although the bacterium was effective in reducing perchlorate, the presence of microorganisms creates various disadvantages. One disadvantage is that the costs are increased due to precautions that must be taken when handling the microorganism, including additional and potentially costly disinfection procedures. Furthermore, systems without microorganisms are easier to handle and more responsive to varying operational conditions.

Another example of a system for removing perchlorate is provided in U.S. Pat. No. 6,531,065 to Gurol et al. In that patent it was shown that zero-valent iron particles can reduce perchlorate to chloride ion, and furthermore that ultra-violet ("UV") radiation can serve as a catalyst for the reduction process. The process involved adding large scale particles of zero-valent iron (in the millimeter range) to perchlorate-containing water in special reactors that accommodate UV radiation tubes.

SUMMARY OF THE INVENTION

It is an object of the present invention to provide apparatus and methods for removing perchlorate from water.

It is another object of the present invention to provide apparatus and methods for removing perchlorate from water and subsequently destroying the perchlorate.

It is another object of the present invention to provide apparatus and methods for removing perchlorate from water and destroying the perchlorate without the use of microorganisms.

It is another object of the present invention to provide apparatus and methods for removing perchlorate from water and destroying the perchlorate that can be used as a stand-alone process or in conjunction with various physical separation processes.

It is another object of the present invention to provide apparatus and methods for removing perchlorate from water and destroying the perchlorate for small-scale individual well-head treatment applications or as part of a large water treatment plant.

Embodiments of the present invention allow reduction of the reactor size by about 99%.

Embodiments of the present invention allow reduction of metallic iron requirements from 100 gram/L to about 1 gram/L.

Embodiments of the present invention allow elimination of UV radiation that may be employed in other systems.

Embodiments of the present invention allow elimination in reactor configurations of restrictions due to UV penetration.

Embodiments of the present invention allow extreme reduction in ferrous formation, and thus elimination of sludge problems.

Embodiments of the present invention allow extreme reductions in the acids and bases needed for pH adjustments.

Embodiments of the present patent application use the basic principle of chemical reduction of perchlorate by zero-valent iron particles to remove perchlorate from water and to destroy the perchlorate.

In an embodiment, a method of removing perchlorate includes filtering perchlorate-polluted water through a column of adsorbents. The column is removed after the capacity of the adsorbent is exhausted. After the exhausted column is removed a new column of adsorbent is installed so that removal of perchlorate may be continued. In an aspect of this embodiment, the column of exhausted adsorbent is subjected to a regeneration process so that it may be reused.

In some embodiments, the major reaction product is chloride ion.

DETAILED DESCRIPTION OF THE INVENTION

A detailed description of an embodiment of the invention is provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
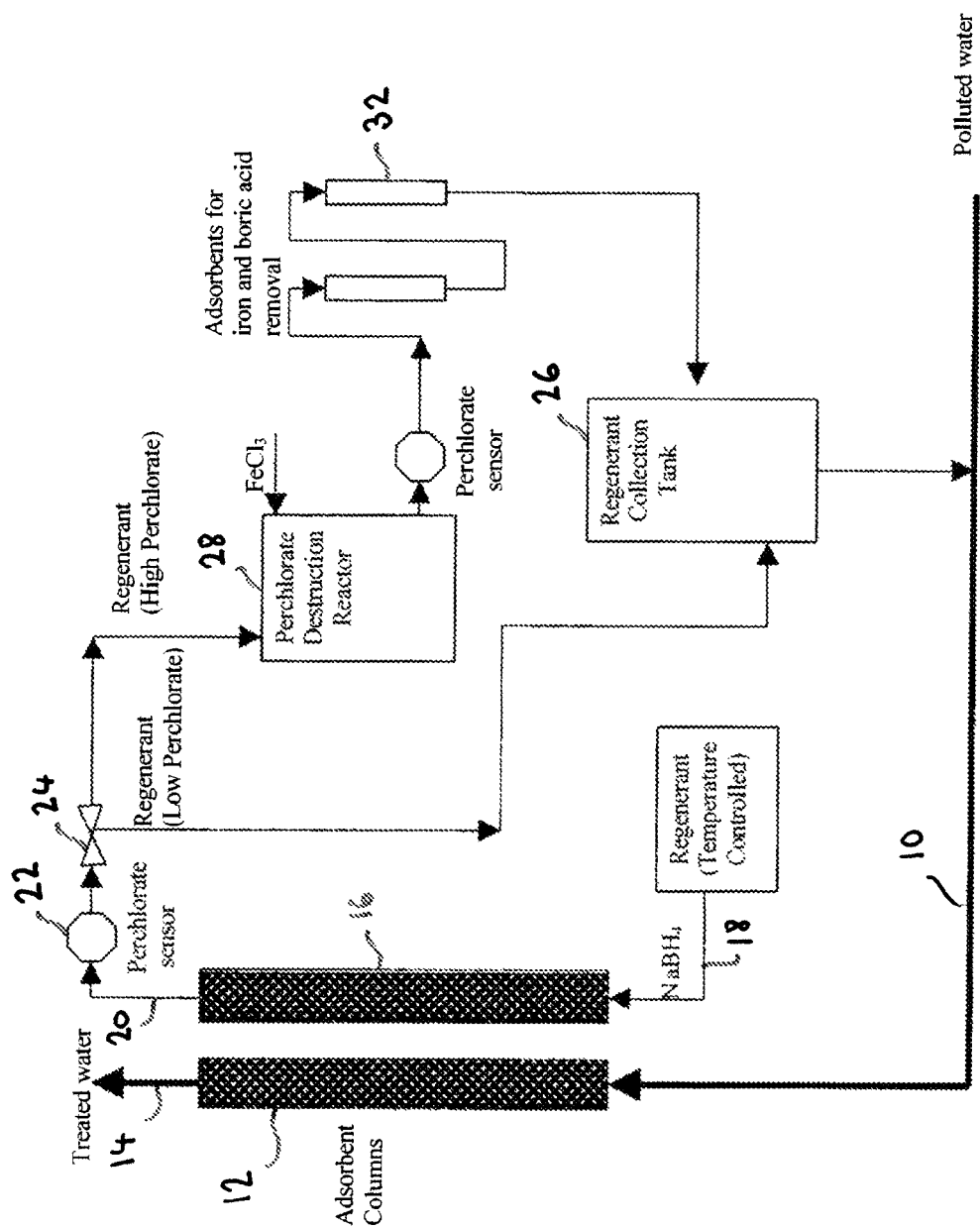
FIG. 1 shows a schematic of an embodiment of the perchlorate removal process of this invention.

Turning first to FIG. 1, an exemplary embodiment of a process for the removal of perchlorate from a fluid and for the subsequent destruction of the perchlorate ($ClO_4^-$) is described. While the present embodiment relates to the removal of perchlorate from water, one skilled in the art will recognize that the present process may also be applied to the removal of perchlorate from other fluids, either liquid or gaseous.

Polluted water 10, that is, water containing perchlorate in excess of a predetermined amount (e.g., 6 ppb), is fed into adsorbent column 12, which contains an adsorbent material, for example, granular activated carbon (GAC). One skilled in the art will recognize that the size of adsorbent column 12, and the granulometry and morphology of the adsorbent, will be selected to maximize contact sites between the adsorbent and polluted water 10, so that all perchlorate dissolved in polluted water 10 receives maximum exposure to the surface of the adsorbent material.

As a result, the adsorbent material captures and retains on its surface essentially all the perchlorate present in polluted water 10, producing treated water 14 that exits adsorbent column 12 containing a perchlorate content below the maximum predetermined amount. If the treated water 14 is intended for potable use, treated water 14 exiting adsorbent column 12 will contain perchlorate in a ppm amount below the maximum amount allowed by the relevant health authorities.

The interaction between the adsorbent surface and the perchlorate is summarized by the following formula (1):

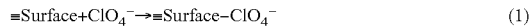
$$\equiv Surface + ClO_4^- \rightarrow \equiv Surface - ClO_4^- \tag{1}$$

Over time, the adsorbent material becomes saturated with perchlorate, losing adsorbing capacity. For example, typical GAC may have approximately 0.1-0.2 mg/gram of perchlorate adsorption capacity, and when such adsorption capacity is substantially exhausted, column 12 is taken out of service and polluted water 10 is diverted to a fresh new column of adsorbent, in order to continue producing water that is essentially perchlorate-free. Typically, GAC can produce perchlorate free water for water equivalent to 1000 BV (bed volume).

The Applicants also showed that the capacity of GAC for perchlorate can be increased substantially if the GAC is pretreated with a non-hazardous surface active agent (surfactant), such as tetradecyldtrimethylammonium bromide, cetylpyridinium chloride, or other such surfactants known in the art. The capacity of GAC can be increased by one hundred times to have 10 mg perchlorate per gram GAC if GAC is treated with surfactants. This increases the service time of the GAC to 100,000 BV.

Exhausted adsorbent column 16 is then subjected to a regeneration process on site by pumping a regenerant through the column. One such regenerant is a solution of sodium borohydride ($NaBH_4$), a water soluble reducing agent. As will be discussed in greater detail below, perchlorate is desorbed readily from the surface of the adsorbent material under appropriate environmental conditions (pH, oxidation reduction potential, concentration of the sodium borohydride, flow rate, and temperature) and is concentrated in the regenerant solution according to a process that can be summarized by the following formula (2):

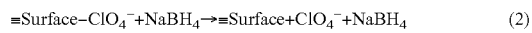
$$\equiv Surface-ClO_4^- + NaBH_4 \rightarrow \equiv Surface + ClO_4^- + NaBH_4 \tag{2}$$

Regenerant solution 18 is preferably a solution of $NaBH_4$ at very low oxidation reduction potential, which is pumped through exhausted adsorbent column 16 to desorb the perchlorate at ambient temperature. Furthermore, the efficiency of perchlorate desorption by $NaBH_4$ is increased significantly by using a stabilizer, such as NaOH. Better results were in fact obtained with 0.05 N NaOH combined with 1 g/L of $NaBH_4$. In addition, the regenerant was recirculated to reduce the total volume requirement. It was demonstrated that the column can be regenerated with a regenerant volume of equivalent to only 2.5 times the Bed Volume (BV).

The amount of perchlorate in stream 20 exiting exhausted adsorbent column 16 is measured by perchlorate sensor 22. Three way valve 24 is situated downstream of exhausted adsorbent column 16 and adjusted to be in an open or closed condition according to the perchlorate level measured by perchlorate sensor 22. In particular, if the perchlorate level measured by perchlorate sensor 22 is determined to be below a predetermined level (e.g., less than 100 ppb), stream 20 is directed to a regenerant collection tank 26, where the regenerant is collected and the remainder solution is recycled into polluted water 10. Instead, if the perchlorate level measured by perchlorate sensor 22 is determined to be above a predetermined level (e.g., higher than 100 ppb), water stream 20 is directed to perchlorate destruction reactor 28, which operates in a batch mode at controlled temperature, pH, pressure and ORP conditions, preferably at T=70-90° C., pH=6-7 , P=0-50 psig, and ORP<–0.1 V.

The small volume of regenerant is treated with a ferric salt (such as iron chloride, sometimes referred to as ferric chloride, or $FeCl_3$) to produce in situ nano-particles of zero-valent iron according to the following unbalanced reaction (3):

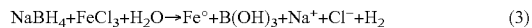
$$NaBH_4 + FeCl_3 + H_2O \rightarrow Fe° + B(OH)_3 + Na^+ + Cl^- + H_2 \tag{3}$$

The nano-particles of zero-valent iron produced in situ then react with perchlorate in the reduced environment according to the following unbalanced reaction (4):

$$ClO_4^- + Fe° \rightarrow Cl^- + Fe^{+2} \tag{4}$$

In Applicants' experimental work, the first order rate constant for destruction of perchlorate varied from 0.0035 to 0.14 $hr^{-1}$, at various temperature, pH, and concentration of iron particles.

Figure 2:
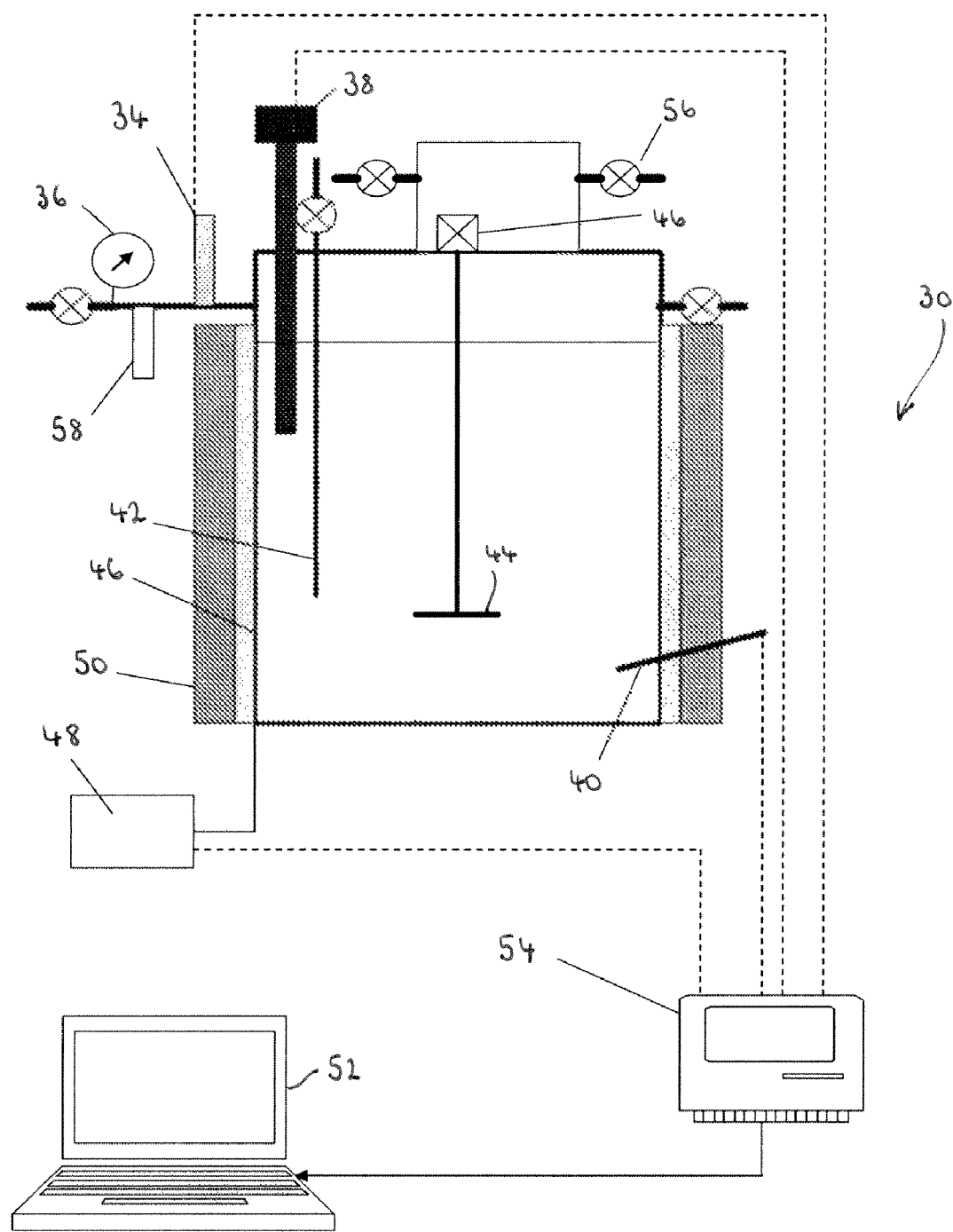
FIG. 2 shows a schematic of a perchlorate destruction reactor of an embodiment of the invention.

FIG. 2 illustrates one embodiment of a reactor for perchlorate destruction 30. The reactor is sealed and equipped with a mixer 44 actuated by a motor 46, pressure sensor 34 and pressure gauge 36, pressure release valve 58, pH probe 38 and temperature sensors 40, and a sampling port 42. The reactor could be fed through a ball valve 56 and be heated by heating tapes 46 receiving energy from a heater 48 and protected by insulation 50 or by other measures. The data in pH, T and P are continuously fed to computer 54 via a control system 54 monitoring performance of the system. Computer 52 has a data acquisition program.

As a result of the above described process steps, perchlorate concentration is decreased in perchlorate destruction reactor 28 to a level of approximately 100 ppb. The regenerant is then sent through a set of additional small-size adsorbents 32 for the removal of iron and boric acid, preferably through greensand for iron and GAC for boric acid. Alternatively, iron can be removed by oxidation and filtration of ferric precipitates. The treated regenerant is then sent to regenerant collection tank 26, becoming mixed with the low perchlorate contents of the tank. When the GAC is pretreated with a surfactant to increase its service life to years, the effluent of the perchlorate reactor can easily be blended with incoming polluted water without any additional treatment for removal of iron and boric acid. That is because the volume of the regenerant will be extremely small (2.5 BV) compared to the water to be treated (100,000BV), hence the dilution factor will be 1/40,000.

The contents of regenerant collection tank 26 are finally bled into polluted water 10, diluting such contents by at least one hundred times. Typically, the perchlorate concentration in tank 26 is diluted to less than 10 ppb perchlorate with the incoming water stream 10. This mixture is successively treated by adsorbent column 12 to reduce the perchlorate in the treated water below the adopted local standards or guidelines.

A person skilled in the art will recognize that embodiments of the present invention can be used as a stand-alone apparatus or process or in conjunction with physical separation processes, e.g., GAC, ion exchange, or RO, to treat either the regenerant or the reject.

Figure 3:
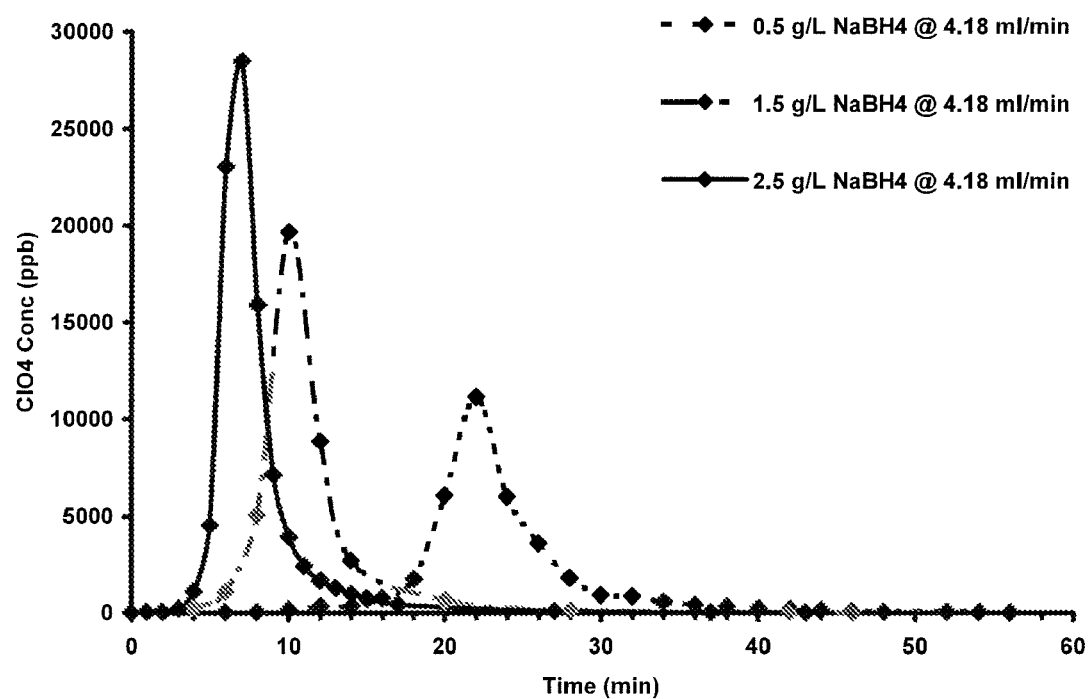
FIG. 3 is a chart demonstrating perchlorate regeneration from granular activated carbon, particularly the effect of borohydride concentration on regeneration.

It should be noted that numerous experiments performed by Applicants have yielded several conclusions on relevant process parameters, and FIGS. 3-6 provide experimental data that support these conclusions. First, of eight different kinds of activated carbon tested, US Filter AC 830 was observed to have the highest capacity for perchlorate and highest efficiency of regeneration by $NaBH_4$. In addition, using $NaBH_4$ solution as a regenerant allows $ClO_4^-$ to be concentrated from 100 ppb to 10-20 ppm. FIG. 3 illustrates graphically the effect of borohydride concentration on GAC regeneration without additional NaOH. As shown in FIG. 3, the regenerant can recover perchlorate from the GAC at 95-100% efficiency with only 2-3 Bed Volume (BV). This is less than 1% of the total amount of water treated. With the use of surfactant, that is less than 0.0025% of the total amount of water treated.

Figure 4:
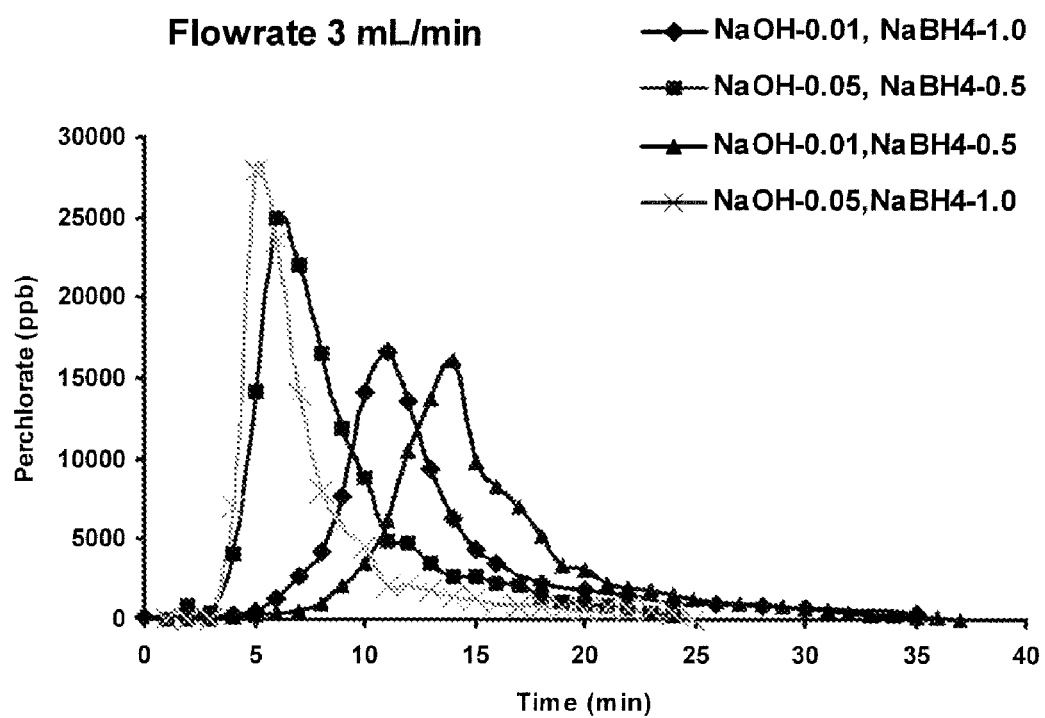
FIG. 4 is a chart demonstrating perchlorate regeneration from granular activated carbon, particularly the effect of NaOH on regeneration.

FIG. 4 illustrates graphically the effect of NaOH on GAC regeneration, where NaOH is expressed in N, and $NaBH_4$ in g/L. As shown in FIG. 4, the use of low concentrations of NaOH (0.01-0.05 N) in the regenerant together with $NaBH_4$ increases the efficiency of the regeneration process and reduces the regenerant volume. Furthermore, the impact of anions in water, including sulfate, chloride and nitrate on GAC adsorption or desorption by $NaHB_4$ was found to be relatively small. Nano-scale particles of metallic iron are formed directly in the reactor by adding the exact amount of $FeCl_3$ solution to the regenerant solution ($NaBH_4$ solution). The concentration of $NaBH_4$ may vary between 0.5-1.2 g/L to produce nano-iron at concentrations between 0.24 to 1.29 g/L.

Figure 5:
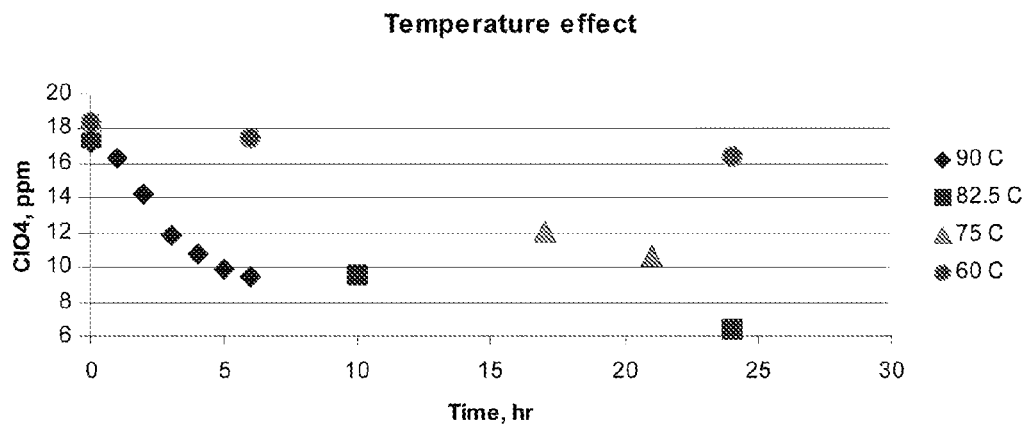
FIG. 5 is a chart demonstrating perchlorate regeneration from granular activated carbon, particularly the effect of temperature on regeneration.
Figure 6:
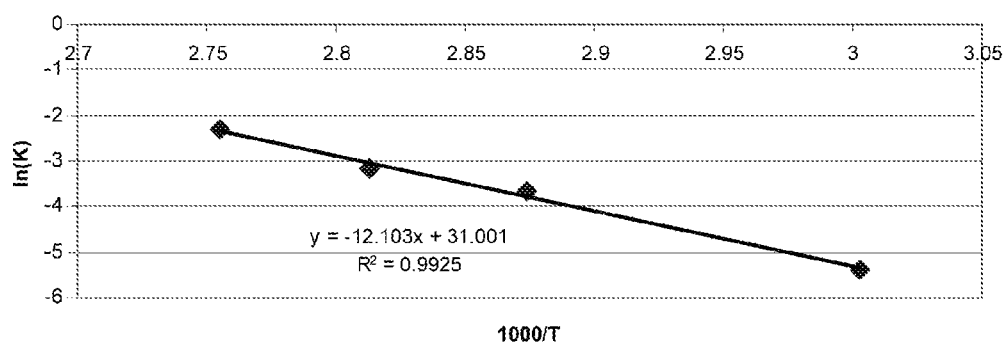
FIG. 6 is a chart demonstrating nano-scale iron concentration during perchlorate destruction.

As shown in FIGS. 5 and 6, the reaction of perchlorate reduction is very sensitive to temperature. The rate constant increases by 6 times and by 24 times at temperatures of 75 and 90° C. as compared to 60° C. The activation energy of the reaction was calculated to be 103 kJ/mole. More particularly, FIG. 6 demonstrates reactions with a nano-scale iron concentration of 1.29 g/L and a pH of 6.5.

As shown in Table 1, the rate of the reaction is strongly dependent on the nano-scale metallic iron concentration. An increase in nano-iron concentration by a factor of five (from 0.24 to 1.20 g/L) produces a seven times increase in perchlorate destruction rate.

TABLE 1

The rate constants for perchlorate destruction at pH 6.6

| Nano iron concentration (g/L) | Temperature (° C.) | Rate Constant ($hr^{-1}$) |
|---|---|---|
| 0.24 | 75 | 0.0035 |
| 0.70 | 75 | 0.0104 |
| 1.20 | 75 | 0.0250 |
| 1.20 | 90 | 0.1000 |
| 0.48 | 85 | 0.0089 |

The reaction is of the first-order with respect to both perchlorate and nano-iron concentration. Accordingly, the reduction reaction is faster for higher concentrations of perchlorate. When the GAC is treated with a surfactant, the desorption process by the same regenerant is not affected significantly, still allowing 80-100% of the perchlorate to be recovered in the regenerant. The majority of the surfactant remained on the GAC (85-95%), very little surfactant leaching into the regenerant. However, the rate of perchlorate destruction in the reactor may be reduced in the presence of the surfactant, leading to longer treatment cycles.

While the invention has been described in connection with the above described embodiment, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art.

What is claimed is:

1. A method of removing perchlorate from a fluid comprising:
    filtering a fluid containing perchlorate through a column of one or more adsorbents whereby the one or more adsorbents retain perchlorate on their surface;
    regenerating the adsorbents of the column by using a regenerant to desorb perchlorate; and
    destroying the perchlorate in the regenerant.

2. The method of claim 1 wherein the one or more adsorbents include granular activated carbon.

3. The method of claim 1 further comprising diverting the fluid containing perchlorate to a fresh column of one or more adsorbents when the column of one or more adsorbents becomes saturated with perchlorate.

4. The method of claim 1 wherein the regenerant is in a solution that includes sodium borohydride and optionally sodium hydroxide or a base that stabilizes sodium borohydride.

5. The method of claim 4 wherein the perchlorate is desorbed from the adsorbent and concentrated in the regenerant solution.

6. The method of claim 1 wherein the regenerant is treated with a salt to produce nano-particles of zero-valent iron.

7. The method of claim 6 wherein the salt is a ferric salt.

8. The method of claim 6 wherein the zero-valent iron reacts with the perchlorate in the regenerant to destroy the perchlorate.

9. The method of claim 1 further comprising:
    using a perchlorate sensor to measure the perchlorate concentration(ppb) in the regenerant; and directing the regenerant to a perchlorate destruction reactor when the regenerant contains greater than a predetermined level of perchlorate.

10. The method of claim 1 further comprising:

using a perchlorate sensor to measure the perchlorate concentration (ppb) in the regenerant; and collecting the regenerant in a regenerant collection tank when the regenerant contains less than a predetermined level of perchlorate.

* * * * *